M. RILING.
Sausage Machine.
No. 31,403.
Patented Feb. 12, 1861.
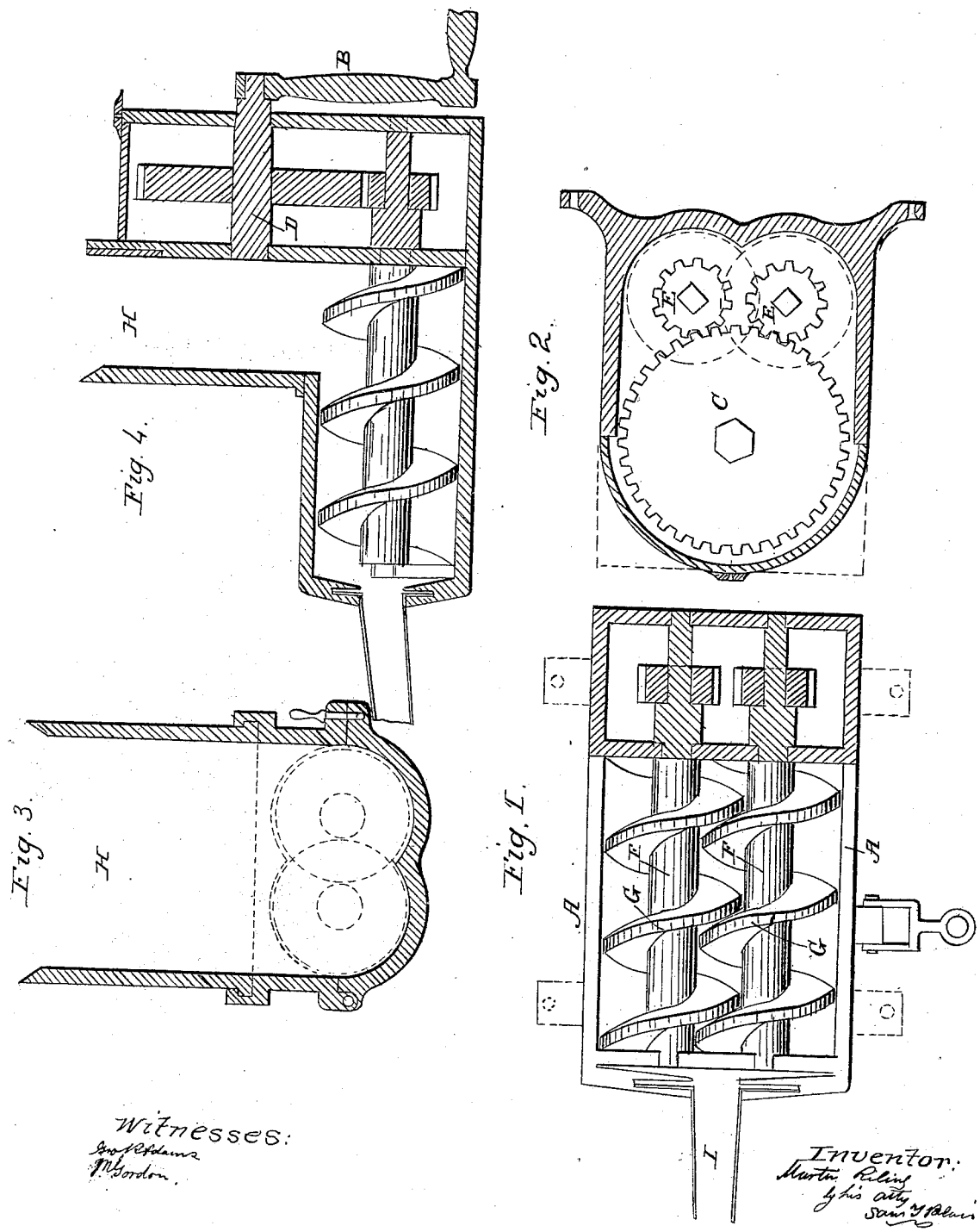

UNITED STATES PATENT OFFICE.

MARTIN RILING, OF ALTOONA, PENNSYLVANIA.

SAUSAGE-STUFFER.

Specification of Letters Patent No. 31,403, dated February 12, 1861.

*To all whom it may concern:*

Be it known that I, MARTIN RILING, of Altoona, in the county of Blair and State of Pennsylvania, have invented a new and Improved Machine for Stuffing Sausages; and I do hereby declare that the following is a full, clear, and exact description of the same, reference being had to the annexed drawings, making a part of this specification, in which—

Figure 1 is a top view of my invention, exhibiting the two screws and the two cog wheels at end as operated by the large cog wheel in Fig. (2). Fig. 2 is an end view of the two cog wheels attached to the two screws in Fig. 1, showing the operation of the large wheel to which the crank is attached. Fig. 3 is a sectional view of my invention, showing the crank, turned by the hand of the operator also the screw, spout and hopper.

This invention consists in a novel and improved arrangement of the power in connection with the two screws, and of the two screws themselves, whereby sausages can be expeditiously and perfectly stuffed, by a machine not liable to become deranged.

In machines of this kind for stuffing sausages it is necessary that the screws should work closely, and work independently of each other. A machine might be made without the cog wheels, and the crank being attached to one of the screws alone, the other would be operated upon by it, but the work would neither be expeditiously nor well done, the meat would choke up and clog the screws. But in my machine the threads of the screws although working as they ought to, closely together, yet work independently, as a consequence the meat is forced or carried immediately through to the spout without checking or in the least clogging the screws. This independent working of the screws is secured by the application of the power to them, through the three cogwheels, as shown by the end view of my machine.

To enable those skilled to make use of my invention I will proceed to describe its operation and construction.

A represents a rectangular box, which may be constructed in any proper way, to support and inclose the working parts of the machine.

B is the crank as operated upon by the workman and which sets the machine in motion.

C is the large cog wheel supported by the shaft D, to which is attached the crank B.

E, E, are the two small cog wheels, which are attached to the body of the two screws F, F, at their ends, and fit into and are operated upon by the large cog wheel C as shown in Fig. 2.

F, F, are the bodies of the two screws operated upon by the cog wheels connected with the crank.

G, G, are the threads of the two screws working closely together.

H is the hopper on top of the rectangular box A, into which the meat is conveyed by the hand of the operator, and from it is received into the machine. I in Fig. 1 is the spout to which is attached the skin, and which conveys the meat into the skin.

Having thus described my invention what I claim as new and desire to secure by Letters Patent, is,

The combination and arrangement of the two screws F F, and the cogwheels C and E E, substantially as, and for the purpose specified.

MARTIN RILING.

Witnesses:
JNO. DEAN,
JOHN BROTHERLIN.